Oct. 16, 1945.    D. W. COOPER    2,386,932
RELEASE LINK
Filed March 20, 1944    2 Sheets-Sheet 1

Daniel. W. Cooper
Inventor
by
T. Harold Fuchs
Attorney

Oct. 16, 1945.  D. W. COOPER  2,386,932
RELEASE LINK
Filed March 20, 1944  2 Sheets-Sheet 2
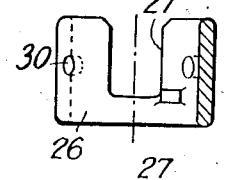
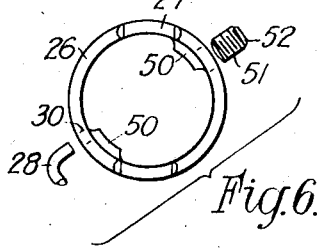
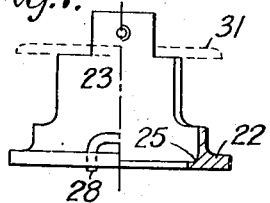
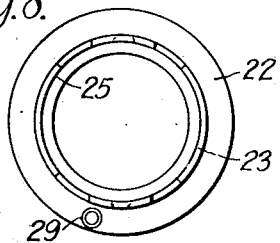
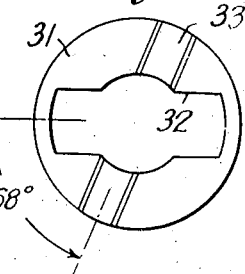
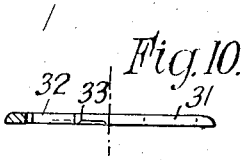
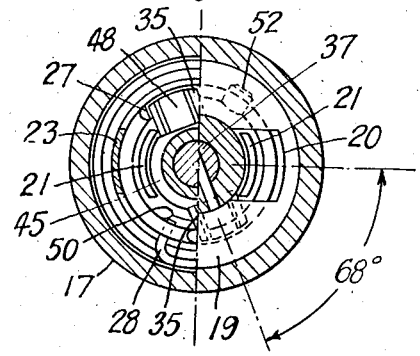
Daniel W. Cooper
Inventor
by
Attorney Patented Oct. 16, 1945

2,386,932

UNITED STATES PATENT OFFICE 2,386,932

RELEASE LINK

Daniel Waumsley Cooper, Waltham Chase, England, assignor to Cunliffe-Owen Aircraft, Limited, Swaythling, near Southampton, England, a British joint-stock company Application March 20, 1944, Serial No. 527,365
In Great Britain February 22, 1943

12 Claims. (Cl. 294—83)

This invention relates to release-links for parachute-borne loads to be dropped from aircraft.

The invention has for its main object to provide an improved release-link of this character which operates automatically to disconnect the load from its parachute or parachutes when the said load reaches the ground or other support.

Another object of the invention is to provide an improved release-link controlled by a timing device so as to prevent premature release within a predetermined period after the dropping of the load from the aircraft.

More specifically, the invention has for an object to provide an automatic release-link comprising parts co-operating in the manner of key and keyhole members and partially rotatable in relation to one another, the parts when rotated interengaging under tension due to the load, with spring means tending to reverse the relative rotation as soon as the load tension is removed.

A further object is to provide an automatic release link comprising relatively rotatable parts, interengaging under the load-tension, with means for holding the parts in their relatively rotated position under the control of a timing device which withdraws the holding means from their operative position at the expiration of a predetermined period.

A still further object is to provide a delay-action release link having a timing device operated by the actual load-tension upon the link.

Other objects and advantages of the invention will hereinafter appear from the following description of a preferred embodiment, given with reference to the accompanying drawings, in which:

Figs. 5, 7 and 10 are half-sectional elevations of three separate parts of the internal mechanism of the link, Figs. 6, 8 and 9 being the corresponding plan views.

Fig. 11 is a cross-section of the link on the broken line 4—4 of Fig. 1, showing the parts in the engaged position.

Figure 1:
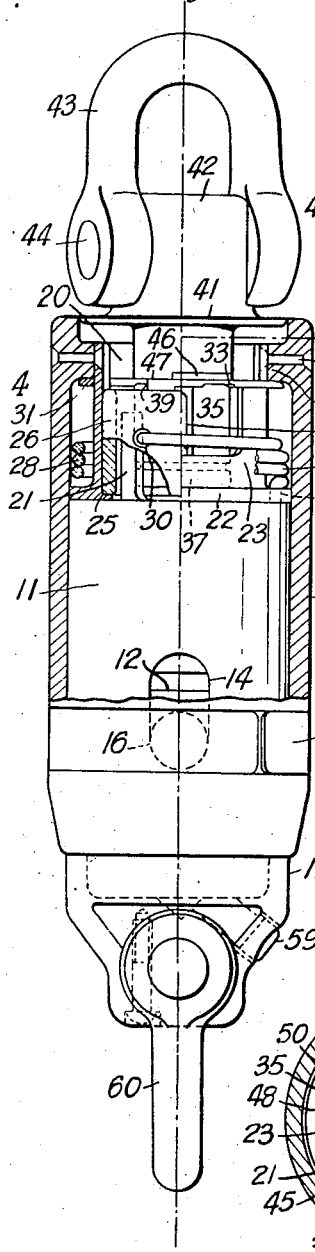
Fig. 1 is a part sectional elevation of the improved release-link, in the engaged and locked position.

In the construction illustrated, the release-link is provided with a timing device in the form of a dashpot constituted by a hydraulic cylinder 11 containing a piston 12, the cylinder being connected to the load and the piston being connected through the co-operating keypiece and keyhole member to the load-supporting parachute. The hydraulic cylinder is composed of two parts 11, 11a, each having a closed end; the two parts are detachably connected together by a screwed joint 13. Two diametrically opposite slots 14 are formed longitudinally along the cylinder through which a pair of gudgeon pins 15 are fitted into the piston; the projecting heads of the gudgeon pins engage in a pair of holes 16 in a socket member 17 which is slidable on the exterior of the cylinder, the gudgeon pins being retained by an encircling spring clip 18 and the sliding movement being limited by the length of the slots 14 in which the gudgeon pins are engaged. The end of the socket member remote from the gudgeon pins is provided with an internal flange 19 of flat annular form having two diametrically opposite notches 20; the parts of the flange left between these notches constitute a pair of jaws, the notched flange acting as a keyhole member. The adjacent end of the cylinder has a projecting sleeve of smaller diameter, slotted longitudinally to leave two opposite tongues or walls 21 of arcuate shape each approximately 90 degrees in angular extent, which are adapted to approach the notches 20 between the jaws in the flanged end of the socket member 17 when the latter is slid over the cylinder but to be moved away from the notches when the socket member slides away from the cylinder to the limit of its travel under the control of the timing device.

Figure 2:
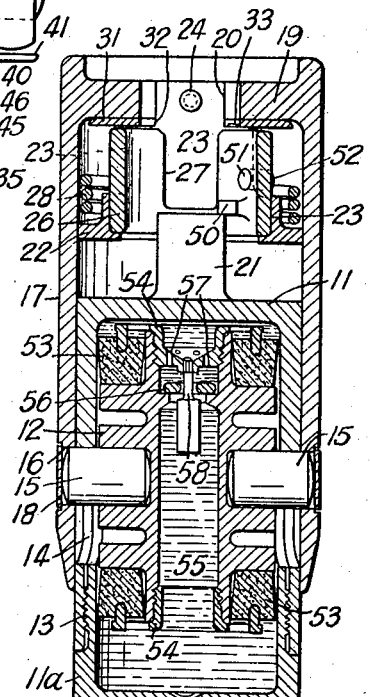
Fig. 2 is a sectional elevation viewed at right angles to Fig. 1, the link being in the released position; the co-operating member is shown separately in Fig. 3.

The socket member 17 is also provided internally and at a position clear of the movement of the cylinder, with an inserted ring 22 (shown separately in Figs. 5 and 6) having a stepped wall 23 diametrically opposite extremities of which are secured by rivets 24 engaged through the flange 19 of the socket member; the inner edge of this walled ring is rebated to produce a quadrantal-section recess 25 supporting a rotatable sleeve 26 (shown separately in Figs. 7 and 8) which extends almost as far as the notched flange 19. The end of the sleeve adjacent to the notched flange is slotted longitudinally to form two diametrically opposite notches 27 capable of registering approximately with the notches 20 in the flange 19 and with the tongues 21, as shown in Fig. 2; by rotation of the sleeve 26, these notches 27 can be brought partly into register with the jaws of the flange 19. The sleeve 26 is controlled by a torsion spring 28 coiled around the ring-wall 23, the two ends of the coil being cranked at right angles and engaged respectively in a hole 29 in the ring 22 and in a hole 30 in the rotatable sleeve.

A latching ring 31, shown separately in Figs. 9 and 10, is fitted beneath the internal flange 19 of the socket member; this ring is notched at 32 in register with the notches 20 of the flange and it is supported by the stepped wall 23 of the ring 22, the highest portions of the wall extending upwards through the notches 32 and into the notches 20, where they are secured by the rivets 24. The lower face of this ring 31 is provided with two shallow radial grooves 33, located for example at angles of about 68 degrees from the notches 32; the edges of the grooves 33 are bevelled at angles of 45 degrees.

Figure 4:
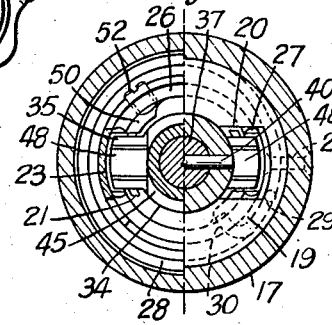
Fig. 4 is a cross section of the link on the broken line 4—4 of Fig. 1, but showing the parts not yet turned to engaged position.

The keypiece consists of a block or butterfly 34, having two opposite wings 35, rotatably mounted upon a spigot member 36 adapted to enter the central hole in the flange 19 of the socket member; the spigot 36 and the boss of the keypiece block 34 fit loosely between the opposite concave faces of the jaws while the keypiece wings 35 are slidable through the notches 20 between the jaws; the angular extent or width of the wings 35 is such that they can slip freely through the notches 20 (as seen on the right hand side of Fig. 4) and also enter with some clearance into the notches 27 (as seen on the left hand side of Fig. 4), engagement of the parts being then effected by turning the keypiece through a suitable angle and against the action of the spring 28 so as to bring the keypiece wings 35 behind the jaws or solid portions between the notches 20 of the keyhole member (as seen in Figs. 1 and 11). In this engaged position, the gaps between the keypiece wings will register with the notches 20 of the flanged keyhole member, and the parts can therefore be locked against reverse rotation by cocking or setting the timing device, thereby bringing the tongues or arcuate walls 21 constantly registering with the notches 20 into the gaps between the wings (as seen in Fig. 11) so as to obstruct the return of the keypiece. At the expiration of the predetermined period, which will be made sufficiently long to ensure that the pull on the link has settled down to a steady value after the deployment of the parachute or parachutes, the timing device will withdraw its tongues or arcuate walls 21 from the registering gaps and notches, so that the wings and jaws are held in engagement by the pull upon the link. As soon as this pull is removed or reduced by the load reaching the ground or other surface, the spring 28 will rotate the keypiece back to its initial angular position (as seen in Fig. 4) so that the wings can slip through the notches of the keyhole member, thereby disconnecting the link and releasing the load from the parachute before any damage or inconvenience can be caused by the load being dragged along the ground or other surface on which it has alighted.

The keypiece is conveniently mounted upon the spigot 36 by means of a headed screw or bolt 37 engaged in a screw-threaded hole 38 in the axis of the spigot; in order to prevent the transmission of any twist from the load to the parachute connections, or vice versa, the keypiece 34 is made freely rotatable upon a bush 39 clamped on the screw shank between the head of the screw and the adjacent end of the spigot, a locking pin 40 being passed diametrically through the spigot and screw to fix the latter. The other end of the spigot, which carries a flat flange 41 covering the notched flange of the socket member, is extended to form a boss 42 for the mounting of a shackle 43 to which the parachute connections are attached, the shackle being secured by a transverse bolt or pin 44.

Suitable coupling means are provided for turning the keypiece or butterfly 34 against the action of the coiled spring 28 after the said keypiece has been passed through the keyhole formed by the notched flange 19 and its wings 35 have been engaged in the notches 27 of the rotatable sleeve; for this purpose, the upper surface of the keypiece is shown with a mortise 45 extending diametrically across it at right angles to the center line of the wings 35, and the lower surface of the spigot member 36 is cut away on two opposite sides, as indicated at 46, to leave a tenon 47 adapted to engage in the mortise 45 when the parts 34, 36 are brought together by relative movement along the bush-fitted screw 37. Thus, the keypiece can be turned manually by means of the shackle 43, after the wings 35 have been engaged in the notches 27 of the rotatable sleeve within the body of the link; the extent of the turning movement required to engage the wings 35 beneath the jaws of the notched flange 19 may be up to 90 degrees, but in the example illustrated the angular movement for engagement and for subsequent release has been selected as 68 degrees, corresponding to the angular location of the radial grooves 33 upon the latching ring 31.

Figure 3:
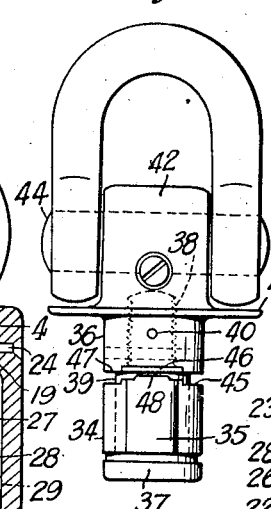

The keypiece 34 is also provided with two radial ribs 48 of small height, upstanding from the wings 35 and aligned therewith; these ribs, which come into register with the radial grooves 33 of the latching ring after the keypiece has been turned through the angular movement of 68 degrees mentioned, are of the same width as the said grooves and have correspondingly bevelled edges. Consequently, when the keypiece has been coupled rotationally to the spigot 36 and its shackle 43 by the mortise and tenon device, the keypiece can be engaged with the socket 17 by pushing its wings 34 through the notches 20 of the socket flange into the notches 27 of the rotatable sleeve, and then turning it approximately 68 degrees against the action of the torsion spring 28, so as to bring its wings 35 beneath the jaws of the socket flange, the ribs 48 then entering the grooves 33 of the latching ring. While the parts are in this position, the hydraulic cylinder is forced up into the socket 17 so as to engage its tongues 21 in the gaps between the wings 35 (as seen in Fig. 11), thereby locking the keypiece against reverse rotation until the piston 12 of the timing device completes its return stroke. When that occurs, the wings and jaws will be held in engagement by the pull due to the load, the operation of the latching ring 31 being sufficient to resist the torque produced by the spring 28; as soon as the load reaches the ground, however, the pull upon the link will be relieved so that the latching ring will no longer hold the keypiece against the action of the spring, but the rotatable sleeve 26 will be caused to turn the wings 35 of the keypiece into register with the notches 20 of the flange, as seen in Fig. 4, thereby allowing the keypiece to disengage from the socket 17, as indicated in Fig. 3, under the upward pull of the parachute.

The timed withdrawal of the locking tongues 21 from the position obstructing the wings 35 of the keypiece takes place before the load reaches the ground, but the shock of striking the ground might cause the link to collapse longitudinally with the result that the locking tongues would return to their obstructing position; such return would not interfere with the rotation of the sleeve 26 or with the disengagement of the keypiece from the socket 17, which have already occurred, but it might prevent the recocking of the release link if it were required to use the device again without delay. The sleeve 26 is therefore provided with internal ledges 50 adjacent to its notches 27, these ledges being at such a height that they will engage the upper ends of the tongues 21 if the latter should return from their withdrawn position while the sleeve 26 occupies the releasing position shown in Fig. 2; the rotation of the sleeve 26 as the keypiece is turned to engage behind the jaws of the socket 17 will, however, carry the ledges 50 clear of the path of the locking tongues, so that the cocking of the timing device can be effected as already described.

The rotatable sleeve 26 is also provided with a projecting stud 51 or the like to limit the rotary movement of the sleeve in relation to the ring 22; the stud 51, which is located above the ledge 50 on one side of the sleeve, has a head 52 extending outwards over the lowest part of the stepped wall 23 of the ring, and it limits the reverse rotation of the sleeve by abutting against the vertical edge of the next higher part of the wall when the notches 27 are in line with the notches 20 and 32 (as seen in Fig. 2).

The piston 12 is preferably fitted with bucket leathers 53 or the like on both faces, these being retained for example by flanged members 54 screwed into a central boring 55 of the piston; the central boring encloses a valve 56 allowing free passage of liquid in one direction, corresponding to the forcing of the cylinder 11 into its socket 17, the liquid then flowing through holes 57 in the upper member 54. The valve restricts passage of liquid in the opposite direction to a narrow annular space in the center of the valve, around the stem of a rod 58, which is fixed to the upper member 54; the liquid will then be forced through the annular space by the actual load-tension upon the link, thus obviating risk of choking by an accidental obstruction. The timing can be changed by replacing the rod 58 by another of different diameter to afford an annular space or jet area of any desired magnitude. Liquid such as oil may be introduced into the hydraulic cylinder by removing a filler plug 59 from the base part 11a, the piston 12 being pulled to the end of the inverted cylinder before introduction of the liquid; care is taken to expel all air by pumping the piston up and down, and the cylinder is then topped up with liquid before finally replacing the plug 59.

It will be noted that in Fig. 1 the upper shackle 43 is set obliquely in relation to the lower shackle 60, the shackle 43 being assumed to remain in alignment with the mortise 45 of the keypiece which has been turned through 68 degrees by means of the tenon 47; similarly, in Fig. 3, the upper shackle 43 is shown in alignment with the mortise 45 of the keypiece, although its tenon 47 is disengaged from the latter. In actual practice, however, the shackle 43 is freely rotatable in relation to the keypiece so as to prevent the transmission of any twist between the load and the parachute connections, the spigot member 36 being coupled to the keypiece 34 by means of the mortise and tenon device only during the engagement of the keypiece with the socket 17 by the cocking movement.

If preferred, the lower shackle 60 may be rotatably connected to the base 11a of the timing cylinder by means of a swivel device to prevent the transmission of twist, the spigot 42 of the upper shackle being then made fast with the keypiece 34 and the coupling means 45—47 omitted.

The release-link may be employed for connecting one or more parachutes to any object or objects to be dropped from aircraft for safe delivery on land or sea, and the respective connections may be attached to either of the shackles 43, 60, or to equivalent devices. The number of jaws and wings upon the co-operating members may be varied, if desired, and their angular extent or width may be different from those mentioned above.

In operation, after the rod 58 has been replaced (if necessary) by one of a different diameter to afford the required jet area according to the magnitude of the particular load and the period of delay-action desired, the cylinder 11 has been drawn down over the piston 12 to the position of Fig. 2, and the lower shackle 60 has been connected to the load, the keypiece 34 will be pushed through the central hole in the flange 19; its wings 35 pass through the notches 20 of the flange, through the aligned notches 32 of the latching ring 31, and into the notches 27 of the rotatable sleeve 26, the reverse rotation of the sleeve by the spring 28 having been limited by the stud head 52 abutting against the vertical edge of the wall 23. The shackle 43 can now be revolved in a clockwise direction, as viewed from that end of the link, until its tenon 47 engages in the mortise 45 of the keypiece, whereupon the two parts 36 and 34 become coupled together so that a further rotation of the shackle through 68 degrees will bring the wings 35 of the keypiece behind the jaws or solid portions of the keyhole member, as seen in Fig. 11; at the same time, the wings 35 rotate the sleeve 26 against the action of the spring 28 to provide the accumulated power for reverse rotation of the sleeve 26 and of the keypiece 34 when subsequently unlocked. The cylinder 11 will next be forced up over the piston 12, this movement being substantially unimpeded by the oil because the valve 56 allows free passage of liquid in this direction, and the tongues 21 will thereby be pushed up towards the notches 20 of the flange 19 so as to slide alongside the wings 35 in a position to lock the keypiece against reverse rotation; the ledges 50 will not interfere with this upward movement of the tongues 21 because the partial rotation of the sleeve 26 has carried the ledges out of the way of the tongues.

So long as the cylinder 11 remains in its upper position, the tongues 21 will lock the keypiece against reverse rotation; the upper shackle 43 may therefore now be connected to the parachute or parachutes, by engaging it with the rigging line rings or equivalent devices, the whole assembly being then stowed in the aircraft and the parachute pack being linked up with the static strop or like automatic release means.

When the load is discharged from the aircraft, the parachute pack will be opened automatically in the well known manner, as soon as the static strop is drawn tight; the deployment of the parachute or parachutes will arrest the fall of the load, by applying tension to the upper shackle 43 of the link while the load pulls down upon the lower shackle 60. The effect of these opposing forces will be to draw down the cylinder 11, thus driving the liquid from above the piston 12 through the restricted passage in the middle of the annular valve 56 to below the piston; due to the resistance caused by the restricted passage for the liquid, the descent of the cylinder 11 will be delayed until all jerking of the shackle connections has ceased, so that the load is supported steadily by the parachute or parachutes. By this time, the cylinder will have withdrawn the locking tongues 21 down to the level seen in Fig. 2, leaving the keypiece unlocked but held firmly in contact with the latching ring 31 by the tension acting through the link; the engagement of the ribs 48 within the grooves 33 of the latching ring will suffice to prevent the spring 28 from rotating the sleeve 26 and keypiece 34, so long as the load tension continues to act.

So soon, however, as the load reaches the ground or other support, the tension upon the link will diminish; consequently, the spring 28 will be able to rotate the sleeve 26 and keypiece 34 back to the unlocked position seen in Fig. 4, the keypiece being pulled out through the notched flange 19 by the drift of the parachute or parachutes, while the body of the link and the load connected to the shackle 60 will remain upon the ground.

What I claim is:

1. A release-link comprising a body member and a keypiece, said body member having a non-circular keyhole for reception of said keypiece, said body member and keypiece being relatively rotatable for interengagement after insertion of said keypiece into said keyhole, means for holding said keypiece and body member relatively rotated to interengagement position, means for applying load-tension to said body member and keypiece, said load-tension acting to maintain the interengagement of said body member and keypiece, and spring means adapted to cause reverse relative rotation of said keypiece and body member upon removal of the load-tension from said applying means, said applying means including a timing device operated by the load-tension and controlling said holding means.

2. A release-link comprising a body member and a keypiece, said body member having a non-circular keyhole for insertion of said keypiece, said body member and keypiece being relatively rotatable for interengagement after insertion of said keypiece into said keyhole, means slidable parallel to the axis of relative rotation of said body member and keypiece for holding them relatively rotated to interengagement position, means for applying load-tension to said body member and keypiece, said load-tension acting to maintain the interengagement of said body member and keypiece, and spring means adapted to cause reverse relative rotation of said keypiece and body member upon removal of the load-tension from said applying means, said applying means including a timing device controlling said slidable holding means, and said timing device coming into operation at the application of load tension to said body member and keypiece.

3. A release-link comprising a body member having an interrupted flange, a winged keypiece engageable with said body member and rotatable in relation thereto, means for holding said keypiece and body member in relatively rotated position, means for applying load-tension to said body member and keypiece, said load-tension acting to maintain the engagement of said body member and keypiece in the relatively rotated position, and spring means adapted to cause reverse relative rotation of said keypiece and body member upon removal of the load-tension from said applying means, said applying means including a timing device controlling said holding means, said timing device causing the withdrawal of said holding means after a predetermined period, and said keypiece being then disengageable from said body member as soon as the load-tension is relieved.

4. A release-link comprising a socket and a keypiece, said socket having a non-circular keyhole for insertion of said keypiece, said socket and keypiece being relatively rotatable for interengagement after insertion of said keypiece into said keyhole, a member rotatable within said socket, said member being adapted for engagement of said keypiece when inserted into said keyhole and being rotatable therewith in relation to said socket, a spring opposing the rotation of said member in relation to said socket, means for holding said keypiece and socket in the relatively rotated position, and means for applying load-tension to said socket and keypiece, said load-tension acting to maintain the interengagement of said socket and keypiece in the relatively rotated position, and said applying means including a timing device controlling said holding means.

5. A release-link comprising a body member and a winged keypiece, said body member having an internal flange notched to form a keyhole for insertion of said keypiece, said body member and keypiece being relatively rotatable after insertion of said keypiece into said keyhole, said keypiece then having its wings engaged with inter-notch portions of the flange of said body member, means for holding said keypiece and body member relatively rotated, means for applying load-tension to said keypiece and body member, said load-tension acting to maintain the engagement of said body member and keypiece in the relatively rotated position, and spring means adapted to cause reverse relative rotation of said keypiece and body member upon removal of load-tension from said applying means, said applying means including a timing device for controlling said holding means.

6. A release-link comprising a socket having an internal flange notched to form a keyhole, a keypiece for insertion in the keyhole of said socket, said keypiece having wings adapted to pass through the notches of the flange during insertion and being thereafter rotatable in relation to said socket for bringing its wings into register with the portions of said flange between the notches thereof, a sleeve rotatable within said socket, said sleeve having notches adapted for engagement by the wings of said keypiece in register with the notches of said flange, a spring controlling the rotation of said sleeve, means for holding said keypiece and socket in relatively rotated position, a timing device controlling said holding means, and means for applying load-tension through said timing device to said socket and keypiece, said load-tension acting to maintain the engagement of said socket and keypiece in the relatively rotated position, and said timing device delaying the reverse relative rotation of said keypiece and socket by said spring-controlled sleeve for a predetermined period after the application of the load-tension to said socket and keypiece.

7. A release-link comprising a body member and a keypiece, said body member having a keyhole for insertion of said keypiece, said body member and keypiece being relatively rotatable for interengagement after insertion of said keypiece into said keyhole, means for applying load-tension to said body member and keypiece, said load-tension acting to maintain the engagement of said body member and keypiece in the relatively rotated position, a swivelling connection in said applying means, spring means adapted to cause reverse relative rotation of said keypiece and body member upon removal of load-tension from said applying means, and means for holding said keypiece and body member relatively rotated, said applying means including a timing device for controlling said holding means.

8. A release-link comprising a socket having an internal annular flange notched at opposite points, a keypiece for engagement with said flange, said keypiece having opposite wings adapted to pass through the notches of said flange, said keypiece and socket being thereafter relatively rotatable for bringing said wings into registering engagement with portions of said flange between the notches thereof, means for applying load-tension to said socket and keypiece, said load-tension acting to maintain the engagement of said socket and keypiece in the relatively rotated position, spring means adapted to cause reverse relative rotation of said keypiece and socket upon removal of load tension from said applying means, said applying means including a timing device enclosed in said socket, and means for holding said keypiece and socket in relatively rotated position, said holding means being controlled by said timing device.

9. A release-link comprising a socket having an internal annular flange notched at opposite points, a keypiece for engagement with said flange, said keypiece having opposite wings adapted to pass through the notches of said flange, said keypiece and socket being thereafter relatively rotatable for bringing said wings into registering engagement with portions of said flange between the notches thereof, means for holding said keypiece and socket in relatively rotated position, a timing device enclosed in said socket, said holding means being controlled by said timing device, means for applying load-tension to said keypiece and timing device, the load-tension applied to said timing device being transmitted to said socket so as to maintain the engagement of said keypiece and socket in the relatively rotated position, and spring means adapted to cause reverse relative rotation of said keypiece and socket upon removal of load-tension from said applying means.

10. A release-link comprising two members rotatable in relation to one another for co-operative engagement under axial tension due to the load, the relative rotation taking place about an axis in alignment with the load tension, means for holding said members in relatively rotated position, spring means adapted to cause reverse relative rotation of said members about said axis upon removal of the load-tension, and a timing device operated by the load-tension for withdrawing said holding means after a predetermined period, said members being then disengageable as soon as the load-tension is relieved.

11. A release-link comprising a socket and a keypiece, said socket having a non-circular keyhole for insertion of said keypiece, said socket and keypiece being relatively rotatable for interengagement after insertion of said keypiece into said keyhole, a member rotatable within said socket, said member being adapted for engagement by said keypiece when inserted into said keyhole and being rotatable therewith in relation to said socket, a spring opposing the rotation of said member in relation to said socket, means for latching said keypiece and socket in the relatively rotated position, and means for applying load-tension to said socket and keypiece, said load-tension acting to maintain the interengagement of said socket and keypiece in the relatively rotated position and also to maintain said keypiece in engagement with said latching means.

12. A release-link comprising a socket and a keypiece, said socket having a non-circular keyhole for insertion of said keypiece, said socket and keypiece being relatively rotatable for interengagement after insertion of said keypiece into said keyhole, a member rotatable within said socket, said member being adapted for engagement by said keypiece when inserted into said keyhole and being rotatable therewith in relation to said socket, a spring opposing the rotation of said member in relation to said socket, a latching ring secured within said socket, co-operating ribs and grooves upon said keypiece and latching ring, and means for applying load-tension to said socket and keypiece, said load-tension acting to maintain the interengagement of said socket and keypiece in the relatively rotated position and to maintain said ribs and grooves in engagement in said position.

DANIEL WAUMSLEY COOPER.